United States Patent [19]
Wei

[11] Patent Number: 5,311,547
[45] Date of Patent: May 10, 1994

[54] PARTIAL-RESPONSE-CHANNEL PRECODING

[75] Inventor: Lee-Fang Wei, Lincroft, N.J.

[73] Assignee: AT&T Bell Laboratories, Murray Hill, N.J.

[21] Appl. No.: 829,820

[22] Filed: Feb. 3, 1992

[51] Int. Cl.$^5$ .................... H04L 25/34; H04L 25/49
[52] U.S. Cl. ........................................ 375/18; 375/34; 375/101; 371/37.8; 341/106
[58] Field of Search ................ 375/18, 25, 34, 39, 375/101; 341/55, 78, 106, 107; 371/37.8, 43

[56] References Cited

U.S. PATENT DOCUMENTS

| | | | |
|---|---|---|---|
| 4,888,775 | 12/1989 | Karabed et al. | 375/18 |
| 5,040,191 | 8/1991 | Forney, Jr. et al. | 375/18 |
| 5,093,843 | 3/1992 | Hirosaki et al. | 375/18 |

Primary Examiner—Stephen Chin
Assistant Examiner—Don N. Vo
Attorney, Agent, or Firm—Ronald D. Slusky

[57] ABSTRACT

Digital data is transmitted over partial-response channels using a precoding technique which allows for the use of a wide variety of transmit constellations. A sequence of signal points is selected from a predetermined base constellation meeting particular criteria. A so-called combined signal point is developed for a present symbol interval by a) selecting a signal point from the base constellation as a function of input bits associated with the present symbol interval and b) combining the signal point thus selected with a feedback signal which is a function of one or more combined signal points that were developed for previous symbol intervals, that function being determined by the characteristic of the partial-response channel. A transmit signal which represents the combined signal points is then provided. In one implementation, the processing steps are performed explicitly using an integrated precoder/constellation mapper. In another implementation those steps are performed implicitly using table look-up.

27 Claims, 11 Drawing Sheets

4-PAM TRANSMIT CONSTELLATION

4-PAM EXPANDED RECEIVER CONSTELLATION

16-QAM TRANSMIT CONSTELLATION

16-QAM EXPANDED RECEIVER CONSTELLATION

CONSTELLATION 1101

FIG. 13

| PRESENT INPUT BITS | PREVIOUS TRANSMITTED SYMBOL | PRESENT TRANSMITTED SYMBOL |
|---|---|---|
| ⋮ | ⋮ | ⋮ |
| 0000 | (3,1) 1011 | (3,1) 1011 |
| 0001 | (3,1) 1011 | (3,-1) 0110 |
| 0010 | (3,1) 1011 | (1,-1) 0001 |
| ⋮ | ⋮ | ⋮ |

PARTIAL-RESPONSE-CHANNEL PRECODING

BACKGROUND OF THE INVENTION

The present invention relates to the transmission of digital data and, more particularly, to the transmission of digital data over partial-response channels, i.e., channels which introduce intersymbol interference.

The problem of transmitting data over partial-response channels arises in a number of commercial contexts. Among these contexts is the transmission of high-definition television (HDTV) signals in existing frequency bands that are allocated to standard (NTSC) TV signals. The problem specifically arises in areas where channels that are unused for NTSC transmission—and are thus candidates for HDTV transmission—are also in use for NTSC transmissions in relatively proximate areas. As an example, TV channel 3 is currently unused in the New York City metropolitan area, but is used in both Philadelphia and Hartford. The consequence of such proximity is that if channel 3 is to be used for HDTV in New York City, the HDTV signal may be corrupted by the channel 3 NTSC signal from Philadelphia or Hartford for New York City HDTV viewers. Conversely, the NTSC signal may be corrupted by the HDTV signal. Such corruption is referred to as "co-channel interference."

It has been realized that one can satisfactorily deal with the co-channel interference from the HDTV signal to the NTSC signal by specifying in the HDTV standards (still under consideration) a sufficiently low transmit power level. Moreover, in order to deal with co-channel interference from the NTSC signal to the HDTV signal, it has been proposed to rely on the fact that an NTSC signal is dominated by energy concentrations at particular locations in the frequency spectrum. Thus, it has been proposed to provide an HDTV receiver with a comb filter having nulls at those frequency locations, thereby removing a significant portion of the interfering NTSC signal, while only minimally degrading the HDTV signal.

The combination of the over-the-air TV channel with the comb filter constitutes a partial-response channel because the comb filter will create so-called "forced" or artificial intersymbol interference (ISI) in the received signal. (The term "channel" is used herein to mean either just the over-the-air broadcast channel or that channel in combination with various components of the receiver, as will be apparent from the context in each case.) Such ISI could be dealt with via the use of a decision feedback equalizer (DFE) in the receiver. However, the error propagation characteristics of DFEs render this a less-than-desirable solution for dealing with the forced ISI. Accordingly, it has alternatively been proposed that a precoder be provided in the HDTV transmitter so as to anticipate, and compensate for, the forced ISI, with the result that the received signal does not suffer from the forced ISI effect. A typical early such precoding technique is disclosed in P. Kabal and S. Pasupathy, "Partial-Response Signaling," *IEEE Transactions on Communications*, Vol. COM-23, No. 9, Sep. 1975, pp. 921-934.

There are two important aspects of any successful such precoding technique. One is that it must be carried out in such a way that the number of symbols of the transmit constellation is substantially the same as the number of different precoder input bit patterns. Although the forced ISI could be dealt with using a Tomlinson-filter-based precoder, such a precoder will, in general, violate this requirement, which arises out of considerations related to transmitted power limitations and receiver equalizer complexity. The other important aspect of a successful precoding technique is that the transmitted information bits be able to be recovered from a respective signal point of the comb-filtered signal, independent of the value of any other signal point thereof. This requirement arises out of the desire to avoid error propagation in the receiver.

To this point, the prior art has indeed been able to satisfy these requirements on the precoder, but only by limiting its proposed HDTV constellation designs to essentially two classes of constellations. One class is M-ary pulse amplitude modulation—a one-dimensional signaling scheme known as M-PAM with M being an integral power of 2. The other class is $M^2$-ary quadrature amplitude modulation, a two-dimensional signaling scheme known as $M^2$-QAM with, again, M being an integral power of 2. Such limitations are potentially problematic. Those skilled in the art appreciate that having the flexibility to select from a wider array of constellation types is advantageous in that, for example, it allows one to provide and trade-off among such system design considerations as a) providing a good match between bit rate and constellation size and b) peak-to-average power ratio. Moreover, I have realized that being able to flexibly select from a broad array of constellations allows one to more readily incorporate within systems using partial-response-channel precoding a multiplexing technique wherein the quality of a received HDTV (or other) signal degrades gracefully as a function of distance from the transmitter. Such technique is described generally (but not in conjunction with partial-response-channel precoding) in my co-pending U.S. patent application with H. Y. Chung and J. Wang, Ser. No. 07/627,156 filed on Dec. 13, 1990.

A further limitation of the prior art partial-response-channel precoding techniques is that they may not be readily usable with comb filters having other than a very simple transfer characteristic—a potential drawback if the application in fact requires a more complicated characteristic.

SUMMARY OF THE INVENTION

The above and other limitations of the prior art are avoided by the partial-response-channel precoding technique of the present invention.

In accordance with one aspect of the invention, a sequence of signal points is selected from a predetermined base constellation. In preferred embodiments, the base constellation is characterized by two criteria. One criterion is that the signal points of the constellation are points of an underlying lattice which has a point at the origin. The other criterion is that the underlying lattice can be formed as the union of a set of non-overlapping translates of the base constellation. Such a set of translates is referred to herein as a set of minimally non-overlapping lattice translates of the base constellation and corresponding signal points of the translates (including the base constellation itself) are said to be minimally non-overlapping lattice translates of one another.

Given such a base constellation, a so-called combined signal point is developed for a present symbol interval by a) selecting a signal point from the base constellation as a function of input bits associated with the present symbol interval and b) combining the signal point thus selected with a feedback signal which is a function of one or more combined signal points that were developed for previous symbol intervals, that function being determined by the characteristic of the partial-response channel. A transmit signal which represents the combined signal point is then provided. The function and the base constellation are such that each combined signal point is a signal point of either a) the base constellation or b) a minimally non-overlapping lattice translate of the base constellation. However, in the transmit signal, all of the combined signal points which are minimally non-overlapping lattice translates of one another are represented identically.

In preferred embodiments, the transmit signal represents each combined signal point with a particular symbol of a transmit constellation, and it is another aspect of the invention that, in particular embodiments, at least two coordinates of the present transmitted symbol are selected jointly by at least one common precoder input bit. That is, it is not possible to separate the precoder input bits into two disjoint "rails" as is characteristic of the prior art and separately precode them to separately identify the coordinates of the transmitted symbol.

It is another aspect of the invention that the partial-response-channel precoding can be carried out for channel characteristics other than those for which the prior art teaches how to do the partial-response-channel precoding.

It is another aspect of the invention that the partial-response-channel precoding can be carried out using transmit constellations other than those used by the prior art in that context. It is thus an aspect of the invention to carry out partial-response-channel precoding using a constellation which is other than an M-PAM or $M^2$-QAM constellation, where M is an integer power of 2.

A number of the objectives achieved by the present invention can, in fact, also be achieved by using the prior art Tomlinson-filter-based precoder, as alluded to above (and as described in further detail hereinbelow). Like the present invention, such a precoder may be distinguishable over the other known precoding techniques in that it, too, may exhibit the aforementioned joint selection property, the ability to work with a wide range of channel characteristics and types of constellations. However, as also noted above, such a precoder does not satisfy the requirement, which is achieved by the present invention (and other prior art), that the number of different binary input word values at the precoder input is substantially equal to the number of symbols of the transmit constellation.

BRIEF DESCRIPTION OF THE DRAWING

FIG. 13 depicts a lookup table realization of a precoder embodying the principles of the present invention.

DETAILED DESCRIPTION

Figure 1:
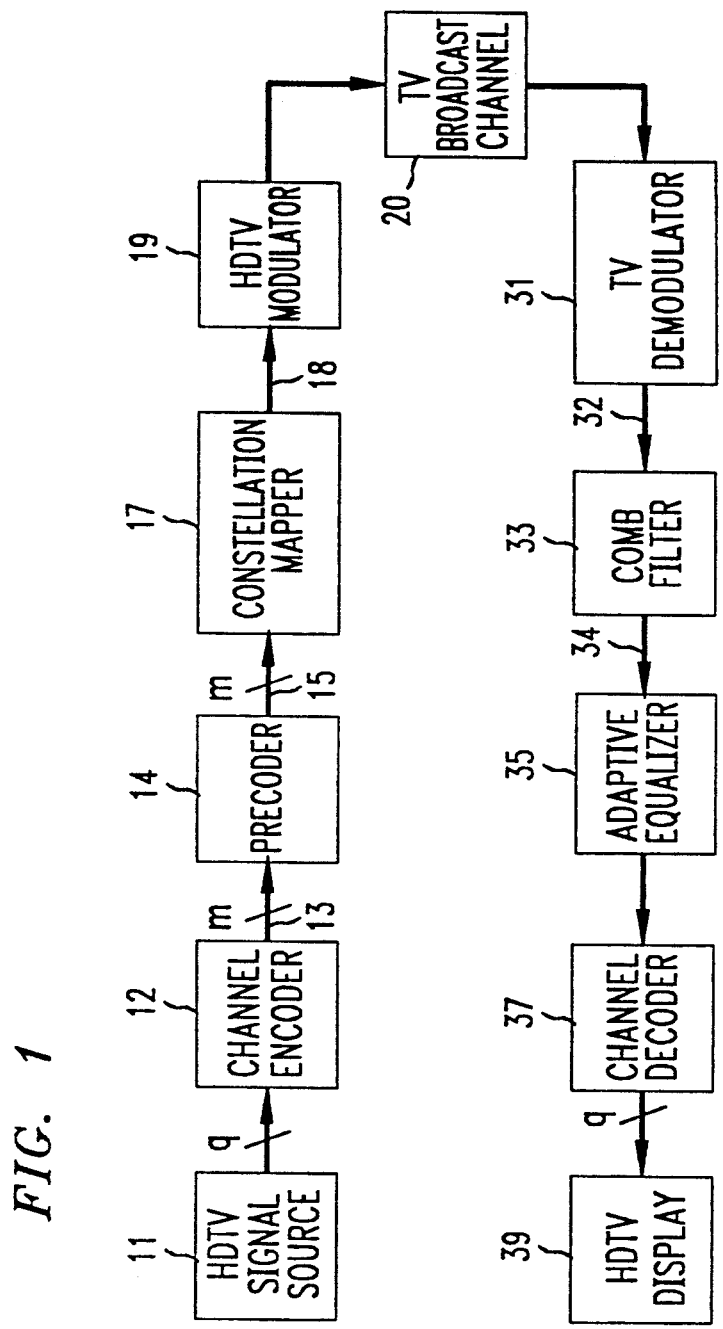
FIG. 1 is a block diagram of an HDTV system in which the present invention can be implemented.

In the HDTV system shown in FIG. 1, binary input data in the form of an HDTV signal is generated by an HDTV signal source 11. Illustratively, source 11 includes a television signal source encoder which converts an originally generated analog television signal into digital form and compresses that signal using any of a variety of well-known techniques. The resulting signal is then applied to a broadcast transmitter, which includes a channel encoder 12. The latter adds redundant bits to the received signal in order to achieve a measure of forward error correction. As such, encoder 12 may implement Reed-Solomon or other classic error correction codes, coded modulation, or combinations of these. Encoder 12 may also include an interleaver which, in known fashion, reorders the coded bits in such a way as to enhance the overall system performance in the presence of bursty noise, the latter arising from such sources as various elements within the transmitter itself, the TV channel and/or various elements within the receiver. The latter elements, in particular, may include the comb filter and/or adaptive equalizer described below.

Illustratively, source 11 delivers q bits per signaling (baud) interval of T seconds to channel encoder 12 and the latter outputs m bits per signaling interval, m>q, onto lead 13. In turn, those bits—referred to herein as the "present input bits"—are applied to precoder 14. (Each group of m present input bits comprises a subset of the data applied to precoder 14 and may also be thought of as a binary data word.) The function of precoder 14 is to process the present input bits in such a way that forced intersymbol interference introduced by the receiver is compensated for. That is, the effects of the forced ISI are countered. The output of precoder 14 is again comprised of m bits per signaling interval. These bits are applied to constellation mapper 17 which outputs on lead 18 for each different group of m bits on lead 15 a different transmit symbol from a predetermined transmit constellation. Various possible constellations are shown in various FIGURES. hereof, as is discussed more fully hereinbelow. The symbols on lead 18 are then modulated into a TV broadcast channel 20 by TV modulator 19.

In the receiver, the modulated signal is applied to TV demodulator 31, which provides a sampled television signal on lead 32. Depending on the modulation format and the characteristics of the comb filter, demodulator 31 may not demodulate the signal all the way to baseband but to some intermediate frequency. Thus (although not explicitly shown herein) a final demodulation to baseband is carried out subsequently within the receiver, e.g., after adaptive equalizer 35. Illustratively, this signal has been corrupted by an NTSC TV signal that was broadcast in the same TV channel by a relatively close NTSC broadcast transmitter. The major portion of the energy of an NTSC signal is concentrated in three relatively narrow frequency bands centered at the luminance, chrominance and sound carriers. Thus the co-channel interference created by the NTSC signal has this same energy distribution and thus it can be removed by a comb filter whose transfer characteristic has nulls, and thus provides loss, at those three frequencies. To this end, the output of demodulator 31 is applied to such a comb filter 33.

The received signal is also corrupted by intersymbol interference which includes, for example, ghosts caused by reflections from buildings, terrain and other multipath-distortion-creating phenomena. In order to compensate for this corruption, an adaptive equalizer 35 receives and processes the comb filter output appearing on lead 34. Adaptive equalizer 35 is designed using a variety of well-known techniques except that the signal constellation assumed by the equalizer in performing its function is not the original transmit constellation but, rather, the so-called expanded receiver constellation described below. The equalizer output is then passed to channel decoder 37, which performs operations which are the inverse of those performed by channel encoder 12 in the transmitter. The resulting q bits per signaling interval are then applied to HDTV display 39, which presents the HDTV signal to a viewer.

Comb filter 33 illustratively has a $(1-D^{-k})$ characteristic, which means that it subtracts from each sample on lead 32 the sample that appeared on that lead k signaling intervals, i.e., kT seconds, earlier. Illustratively, k=12. As a consequence of that operation, comb filter 33 not only removes a substantial portion of the NTSC interference, as desired, but also, disadvantageously, introduces so-called "forced" or artificial intersymbol interference (ISI), which is manifest by the occurrence of an expanded signal constellation at the receiver which, again, is described below. In theory, this forced ISI could be dealt with via the use of a decision feedback equalizer (DFE) in the receiver which, in effect, recovers the original transmit constellation. However, the error propagation characteristic of DFEs renders this a less-than-desirable solution.

As is known in the art, the use of precoder 14 represents a more desirable solution. In particular, the precoder anticipates, and compensates for, the forced ISI, with the result that the signal on lead 34 does not suffer from the forced ISI effect.

Figure 2:
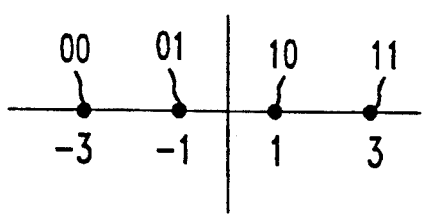
FIG. 2 depicts a 4-PAM constellation typical of one class of transmit constellations used in the prior art.

In order for this to be appreciated, we consider a first example, in which m=2 and the constellation implemented by constellation mapper 17 is the constellation shown in FIG. 2. This constellation is illustrative of a first class of constellations used in the prior art in conjunction with partial-response-channel precoding. This class is M-ary pulse amplitude modulation—a one-dimensional signaling scheme known as M-PAM with M being an integral power of 2. The constellation of FIG. 2, more particularly, is a 4-PAM constellation. In particular, each of the four possible combinations of values of the m=2 bits appearing on lead 15 is associated with a different one of the symbols of the constellation in the manner shown. The coordinates of the symbols of the constellation are successive odd integers. Thus, the coordinates of the symbols labeled with the bit patterns 00, 01, 10 and 11 are −3, −1, 1 and 3, respectively. As each pair of bits appears on lead 15, the associated symbol is output by constellation mapper 17 to TV modulator 19.

Further, we need to consider the effect that comb filter 33 has on the constellation of symbols that is output by adaptive equalizer 35. It will be appreciated from a consideration of the aforementioned discussion of the operation of comb filter 33 that the output of equalizer 35 is comprised of symbols of the constellation shown in FIG. 3. This constellation—referred to as the "expanded receiver constellation"—has seven receiver symbols which are centered at the origin and has the same symbol spacing (of 2) as the transmit constellation of FIG. 2. As an example, if the symbol at −1 is transmitted and a symbol at +3 had been transmitted kT, i.e., 12 T, seconds earlier, the symbol at the output of the equalizer will be the symbol whose coordinate is $(-1)-(+3)=-4$.

(As those skilled in the art are well aware, such factors as Gaussian noise, other channel impairments, and the inability of any equalizer to do a perfect job of equalization are such that the symbols at the equalizer output will not each fall precisely at the exact locations of the expanded receiver constellation. Rather, they fall in clusters surrounding each such location. By appropriately implementing channel decoder 37, however, one can identify the proper symbol of the expanded receiver constellation for each received symbol with a high degree of accuracy.)

Notwithstanding the expansion of the constellation from four symbols to seven, the prior art teaches that it is possible to recover the present input bits on lead 13 by appropriate design of precoder 14 in combination with an appropriate symbol-to-bit mapping for the expanded receiver constellation. In this example, in particular, precoder 14 implements a modulo 4 addition operation whose present output on lead 15 is the sum, modulo 4, of the present input bit pair on lead 13 and the bit pair that appeared on lead 15 kT seconds earlier. Thus, if the present input bit pair on lead 13 is "10" and the bit pair that appeared on lead 15 kT seconds earlier was "11", the modulo 4 sum provided as the present output on lead 15 is "01", thereby resulting in the transmission of the symbol whose coordinate is −1, as indicated in FIG. 2.

Figure 4:
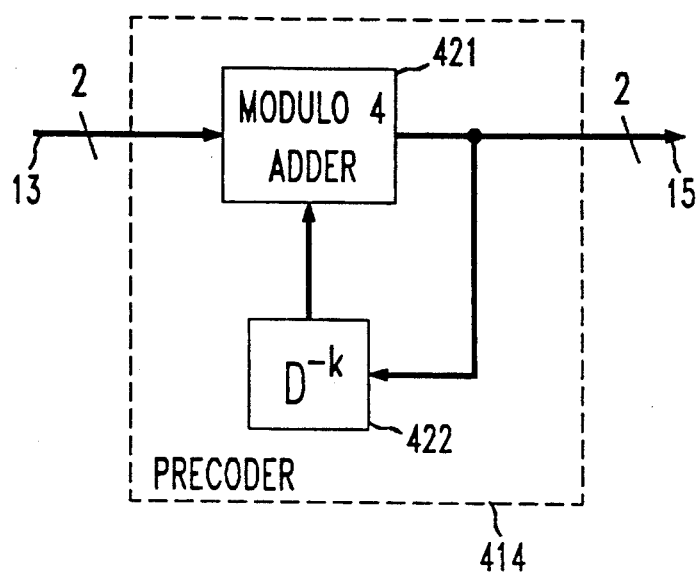
FIG. 4 is a block diagram of a precoder that can be used in the system of FIG. 1 in conjunction with the transmit constellation of FIG. 2.

Such a realization of precoder 14 is shown in FIG. 4 as precoder 414. The latter includes modulo 4 adder 421 which receives the present input bit pair on lead 13 and adds it, modulo 4, to the bit pair that was output by adder 421 onto output lead 15 kT seconds earlier. The latter bit pair is provided by kT-second-delay element 422.

Figure 3:
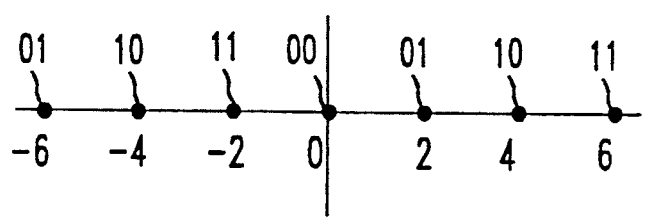
FIG. 3 depicts an expanded receiver constellation resulting from the use of the transmit constellation of FIG. 2.

The appropriate symbol-to-bit mapping for the expanded receiver constellation is shown in FIG. 3. In particular, carrying through with the example introduced above, the received symbol at the output of the equalizer has the coordinate −4 which, as seen from FIG. 3, corresponds to the bit pair "10"—the same as the assumed present input bit pair on lead 13 at the input to precoder 14. Advantageously, then, the bits have been recovered solely as a function of a single symbol provided at the equalizer output. Absent the bit processing provided by precoder 14, it would not be possible to recover the bits that appeared on lead 13 because each given bit pair could result in any of four symbols of the expanded receiver constellation.

Figure 5:
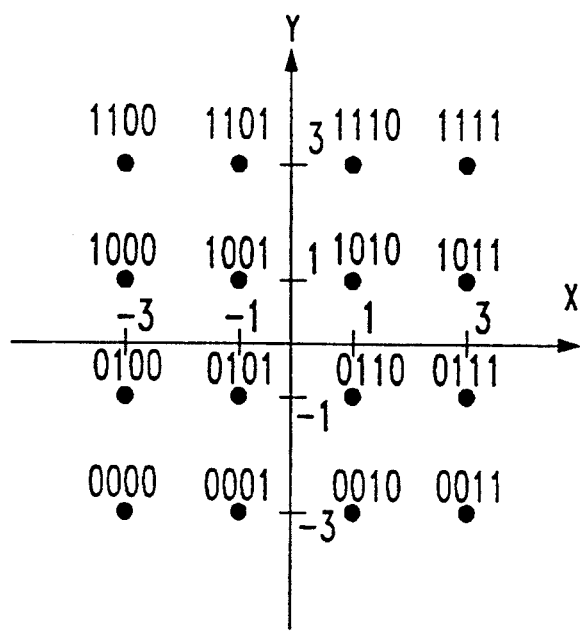
FIG. 5 depicts a 16-QAM transmit constellation typical of a second class of transmit constellations used in the prior art.
Figure 6:
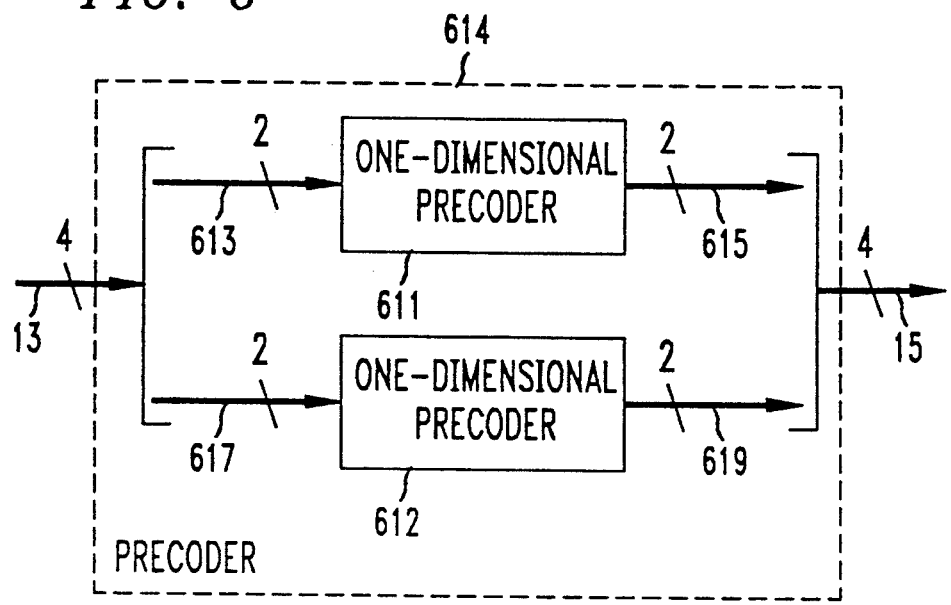
FIG. 6 is a block diagram of a precoder that can be used in the system of FIG. 1 in conjunction with the transmit constellation of FIG. 5.

The above precoding concepts have been extended by the prior art to a limited extent to two-dimensional constellations. Consider, for example, the transmit constellation of FIG. 5. This constellation is illustrative of a second class of constellations used in the prior art in conjunction with partial-response-channel precoding. This class is $M^2$-ary quadrature amplitude modulation, a two-dimensional signaling scheme known as $M^2$-QAM with, again, M being an integral power of 2. (Given that the signaling scheme is two-dimensional, each symbol has two coordinates rather than only one as in the previous case.) Here, M=4, so that the constellation of FIG. 5 is, more particularly, a 16-QAM constellation. A precoder that would be used by the prior art in conjunction with this transmit constellation is precoder 614 shown in FIG. 6. As indicated in the figure, precoder 614 is simply comprised of two one-dimensional precoders 611 and 612 which illustratively are identical to precoder 414. Two of the present input bits from lead 13 are directed via lead 613 to precoder 611 in order to provide a pair of precoded bits on lead 615. The other present input bits from lead 13 are directed via lead 617 to precoder 612 in order to provide a second pair of precoded bits on lead 619. The bits on leads 615 and 619 are extended to constellation mapper 17 via lead 15. The constellation mapper uses the bit pair from lead 615 to select a particular row of symbols from the constellation of FIG. 5. These are the first two of the four bits associated with each symbol as shown in FIG. 5. The constellation mapper similarly uses the bit pair from lead 619 to select a particular column of symbols from the constellation of FIG. 5. These are the last two of the four bits associated with each symbol as shown in FIG. 5.

Figure 7:
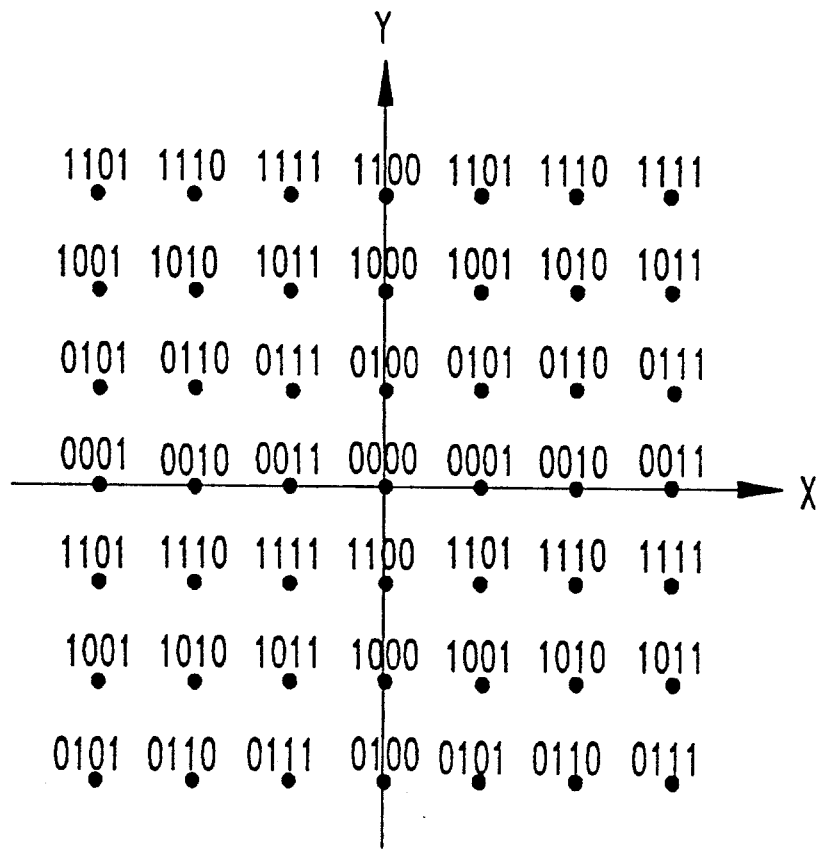
FIG. 7 depicts an expanded receiver constellation resulting from the use of the transmit constellation of FIG. 5.

The expanded receiver constellation that results from the use of the constellation of FIG. 5—assuming the same comb filter—is a square 49-symbol constellation of FIG. 7. It can be easily shown that, as in the one-dimensional case presented earlier, the bits on lead 13 can be uniquely recovered from the present received symbol alone by replicating the symbol-to-bit mapping scheme of FIG. 3 in two-dimensions, as shown in FIG. 7.

The above described prior art partial-response-channel precoding approach is generally satisfactory as long as one is willing to limit the transmit constellation to either M-PAM or $M^2$-QAM constellations. However, if one is interested in using a two-dimensional constellation that is not an $M^2$-QAM constellation, it is not possible to identify a particular symbol by using two independent bit streams—such as those on leads 613 and 617—to independently select the two coordinates of the symbol. This follows from the fact that, for constellations which are other than $M^2$-QAM, there are some combinations of allowed coordinates which do not correspond to any symbol in the constellation. Looking ahead to the constellation of FIG. 8, for example, symbols of this constellation have the coordinate "3" on the horizontal axis, and others have the coordinate "3" on the vertical axis but not in combination with each other. For example, there is no symbol at location (3,3). Indeed, the prior art does not teach how to construct an appropriate precoder using a constellation which is other than an M-PAM or $M^2$-QAM constellation with M being an integer power of 2. Moreover, for both M-PAM and $M^2$-QAM constellations, the prior art does not teach how to construct an appropriate precoder for other than very simple partial-response channels, e.g., systems using comb filters that have other than very simple characteristics. It is to the provision of such precoders that the present invention is directed.

(In the discussion which follows, we make a distinction between the terms "signal point" and "symbol," although these terms are often used interchangeably in the art as simply meaning a point in the signal space in question. Indeed, they could be used interchangeably here, as well. However, for pedagogic clarity, we generally use the term "signal point" to refer generically to a point in the signal space, while we use the term "symbol" to mean a signal point which is either actually transmitted over, or recovered from, the channel.)

In accordance with one aspect of the invention, a sequence of signal points is selected from a predetermined base constellation. In preferred embodiments, the base constellation is characterized by two criteria, referred to hereinafter as criterion "a" and criterion "b". Criterion "a" is that the signal points of the constellation are points of an underlying lattice which has a point at the origin. Criterion "b" is that the underlying lattice can be formed as the union of a set of non-overlapping translates of the base constellation. Such a set of translates is referred to herein as minimally non-overlapping lattice translates of the base constellation and corresponding signal points of the translates (including the base constellation itself) are said to be minimally non-overlapping lattice translates of one another.

Given such a base constellation, a so-called combined signal point is developed for a present symbol interval by a) selecting a signal point from the base constellation as a function of input bits associated with the present symbol interval and b) combining the signal point thus selected with a feedback signal which is a function of one or more combined signal points that were developed for previous symbol intervals, that function being determined by the characteristic of the partial-response channel. A transmit signal which represents the combined signal point is then provided. The function and the base constellation are such that each combined signal point is a signal point of either a) the base constellation or b) a minimally non-overlapping lattice translate of the base constellation. However, in the transmit signal, all of the combined signal points which are minimally non-overlapping lattice translates of one another are represented identically.

One way of implementing the invention is to perform the above-described signal point processing steps explicitly using an integrated precoder/constellation mapper. Another way is to perform those steps implicity. In this latter approach—which provides an independent precoder and constellation mapper, per FIG. 1—the precoder is realized as a lookup table which receives as its inputs a) the input bits from lead 13 and b) a signal which represents in bit form the aforementioned previous combined signal points used for generating the feedback signal. The output of the table for each combination of those two inputs is a set of precoded bits which represents the combined signal point developed for the present signal interval. Examples of each of those approaches will now be presented.

Figure 9:
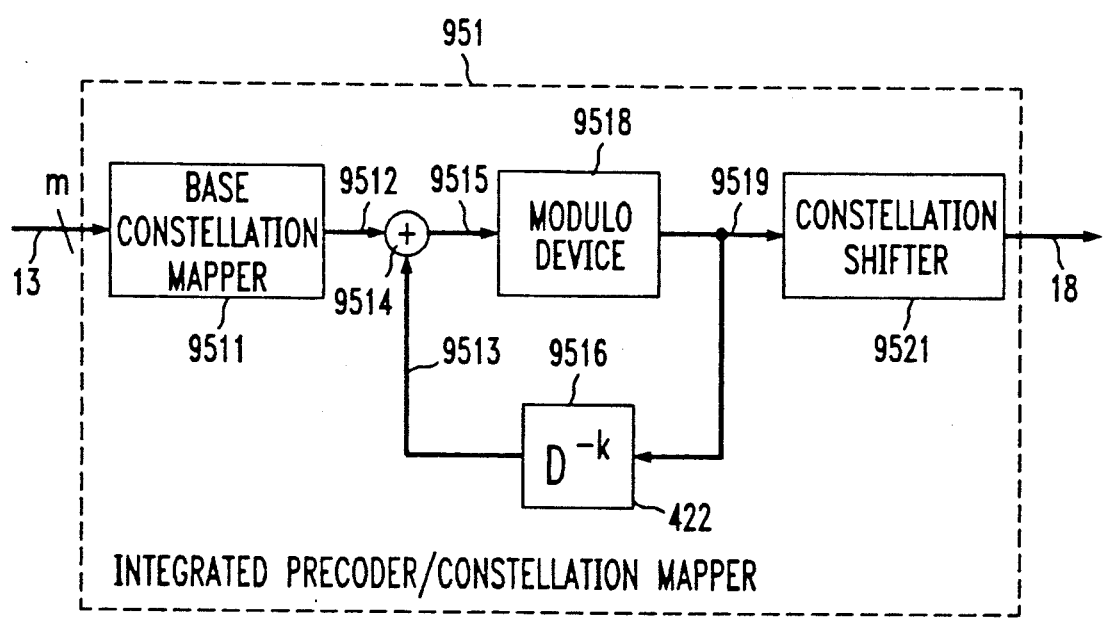
FIG. 9 is a block diagram of an integrated precoder/constellation mapper that can be used in the system of FIG. 1 to implement the invention.

Specifically, an integrated combined precoder/constellation mapper 951 embodying the principles of the invention as just described is shown in FIG. 9. The input data bits on lead 13 are applied to base constellation mapper 9511, which selects for each different combination of the values of the m bits (i.e., for each different binary data word value) a respective signal point of the illustrative base constellation shown in FIG. 10 to provide a sequence of signal points of that base constellation. The latter is denominated base constellation 1101. Since the constellation has twelve signal points, the value of m must be 4, with only twelve different combinations of those four bits actually occurring. (The manner in which such a bit stream can be provided is described, for example, in my U.S. Pat. No. 4,941,154 issued Jul. 10, 1990.) Note that the signal points of this constellation are, indeed, points of a lattice which has a point at the origin, per criterion "a" set forth above. Indeed, one of the signal points of the constellation is at the origin. Moreover, a consideration of FIG. 11, which shows the base constellation 1101 from FIG. 10 and six of its (infinite number of) translates 1102 through 1107, reveals that criterion "b" is also satisfied. The signal points in any particular translate can be arrived at by translating the signal points of the base constellation by the same predetermined amount. In this case, the predetermined amount has the form of $k_1 \cdot (4,6) + k_2 \cdot (4,-6)$ for integer $k_i$, $i=1,2$. Thus, in particular, each signal point in the translate 1102 can be obtained by translating a corresponding signal point of the base constellation 1101 by 4 in the X dimension and 6 in the Y dimension, corresponding to the case of $k_1=1$, $k_2=0$.

Each signal point that is output by base constellation mapper 9511 on lead 9512 is applied to adder 9514, where it is combined with—illustratively, added to—a signal on lead 9513 to provide what is referred to here as a "combined signal point" on adder output lead 9515. As a consequence of adhering to criteria "a" and "b" above, all of the signal points of the sequence of combined signal points on adder output lead 9515 are guaranteed to be signal points of either the base constellation or one of its minimally non-overlapping lattice translates. That is, it is one of the signal points of FIG. 11. The signal on lead 9515 is applied to modulo device 9518 which always provides on its output lead 9519 a signal representing a signal point of the base constellation. In particular, if the signal on lead 9515 already represents a signal point of the base constellation, then the modulo device simply provides a signal representing that signal point on lead 9519. On the other hand, if the signal on lead 9515 represents a signal point in one of the translates, then the modulo device provides on lead 9519 that signal point of the base constellation to which the translate signal point corresponds. Thus, for example, looking at FIG. 11, if the signal on lead 9515 represents the signal point at (2,2), which is in translate 1102, then the output of modulo device 9518 is the base constellation signal point $(-2,-4)$.

The aforementioned signal on lead 9513 is generated by a circuit 9516, whose structure is determined by the nature of the forced ISI that will be later introduced into the signal—in this case by comb filter 33—with a view toward compensating for that forced ISI. Since comb filter 33 illustratively has a $(1-D^{-k})$ characteristic, then circuit 9516 has a $D^{-k}$ characteristic. That is, it is simply a delay element which imparts a delay of kT seconds to the signal points appearing on lead 9519. The overall combined effect of elements 9514, 9518 and 9516 is to compensate for the forced ISI effect of comb filter 33, as described more fully hereinbelow.

Advantageously, the invention allows for the precoder/constellation mapper to compensate for virtually any form of forced ISI, no matter how complicated, although one may be limited to cases in which the characteristic of the partial response channel has integer coefficients. One simply uses the characteristic of the partial-response channel—in this example, the characteristic of the comb filter—to determine a complementary characteristic for circuit 9516. For example, in further embodiments of the invention, comb filter 33 may have the transfer characteristic $$1 - \sum_{i=1}^{J} c_i D^{-i}$$

with integer coefficients $c_i$, some of which can be zero, and with, for example, $J \geq 2$. In this case, circuit 9516 would implement $$\sum_{i=1}^{J} c_i D^{-i}.$$

The prior art has not taught or suggested partial-response-channel precoding for such complicated channels. It is thus an aspect of the invention to carry out partial-response-channel precoding where the channel characteristic, and thus each receiver symbol, is a function of the present transmit symbol and is a further function of either a) at least two others of the communicated transmit symbols or b) a multiple of one other of the communicated transmit symbols. Examples are such characteristics as $1 - D^{-10} - D^{-12}$; $1 + 2D^{-6} - D^{-10}$; and $1 - 2D^{-12}$.

Figure 8:
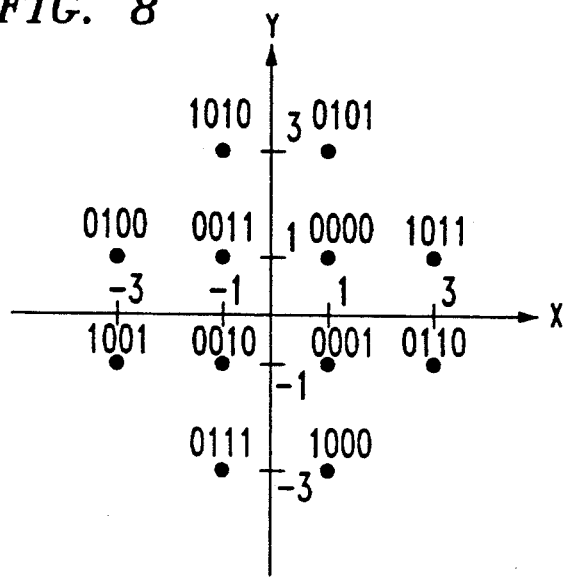
FIG. 8 depicts a 12-symbol constellation made usable as a transmit constellation for the system of FIG. 1 by virtue of the present invention.

In theory, the signal points on lead 9519 could be used as the transmitter output. However, it is advantageous to utilize a constellation that more nearly meets various known desirable criteria such as low peak and average transmitted signal power, phase symmetries, etc. To this end, the signal points on lead 9519 are shifted by constellation shifter 9521 to provide on lead 18 a constellation of symbols as shown in FIG. 8. Note that this constellation is simply a shifted version of the base constellation. The effect of such shifting vis-a-vis the precoding can be accounted for in the receiver, as discussed below.

In summary, it will be appreciated that the transmit signal provided on lead 18 represents the combined signal points of lead 9515 in such a way that all of the combined signal points which are minimally non-overlapping lattice translates of one another are represented identically, i.e., by a particular one symbol of the transmit constellation of FIG. 8.

It should also be noted that, in accordance with an aspect of the invention, the values of the bits associated with the various transmitter symbols of FIG. 8 interdependently identify the values of the two coordinates of those symbols. That is, unlike the prior art case of FIG. 5—where the first two bits of each word are associated with the row (Y coordinate) and the second two bits are associated with the column (X coordinate)—one needs to look at all the bits of each word in FIG. 8 in order to determine either the row or the column of the associated symbol. Indeed, it is this aspect of the invention that allows for the use of constellations other than those used by the prior art in this context, as mentioned above.

It is useful to point out at this juncture certain distinctions between the present invention and the aforementioned Tomlinson-filter-based precoding approach known in the prior art. Such a precoder has a structure that is generally similar to that shown in FIG. 9. That prior art structure, however, does not embody the concept of a base constellation as taught by the present invention. Rather, mapper 9511 implements a constellation such as the constellation of FIG. 8. Also, there is no notion of a constellation shifter. As a consequence of these differences, the transmit constellation on lead 18 is different from the constellation implemented in mapper 9511 in a very significant way. Specifically, the transmit constellation in this case will be comprised of many more symbols than the constellation of, in this example, FIG. 8. This is quite disadvantageous, as noted earlier. Quantitatively, it can be observed that the present invention (like the prior art discussed above in conjunction with FIGS. 4 and 6) provides a transmit constellation whose number of symbols is substantially the same as the number of different precoder input bit patterns, or word values. In the above example, there are 12 different precoder input bit patterns applied to base constellation mapper 9511 and there are 12 symbols in the transmit constellation appearing on lead 18. By contrast, the Tomlinson-filter-based approach will result in a transmit constellation having many more symbols.

Figure 10:
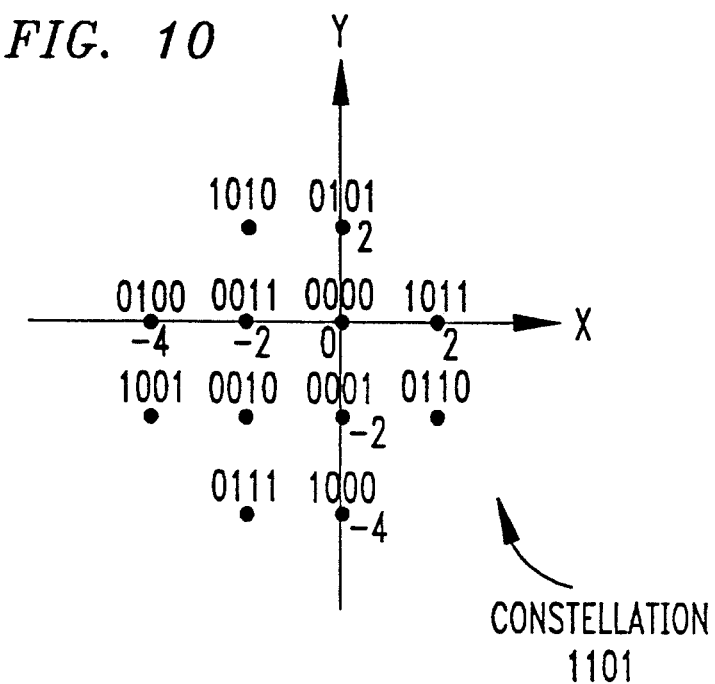
FIG. 10 depicts a so-called base constellation corresponding to the transmit constellation of FIG. 8 and illustratively used in the precoder/constellation mapper.
Figure 11:
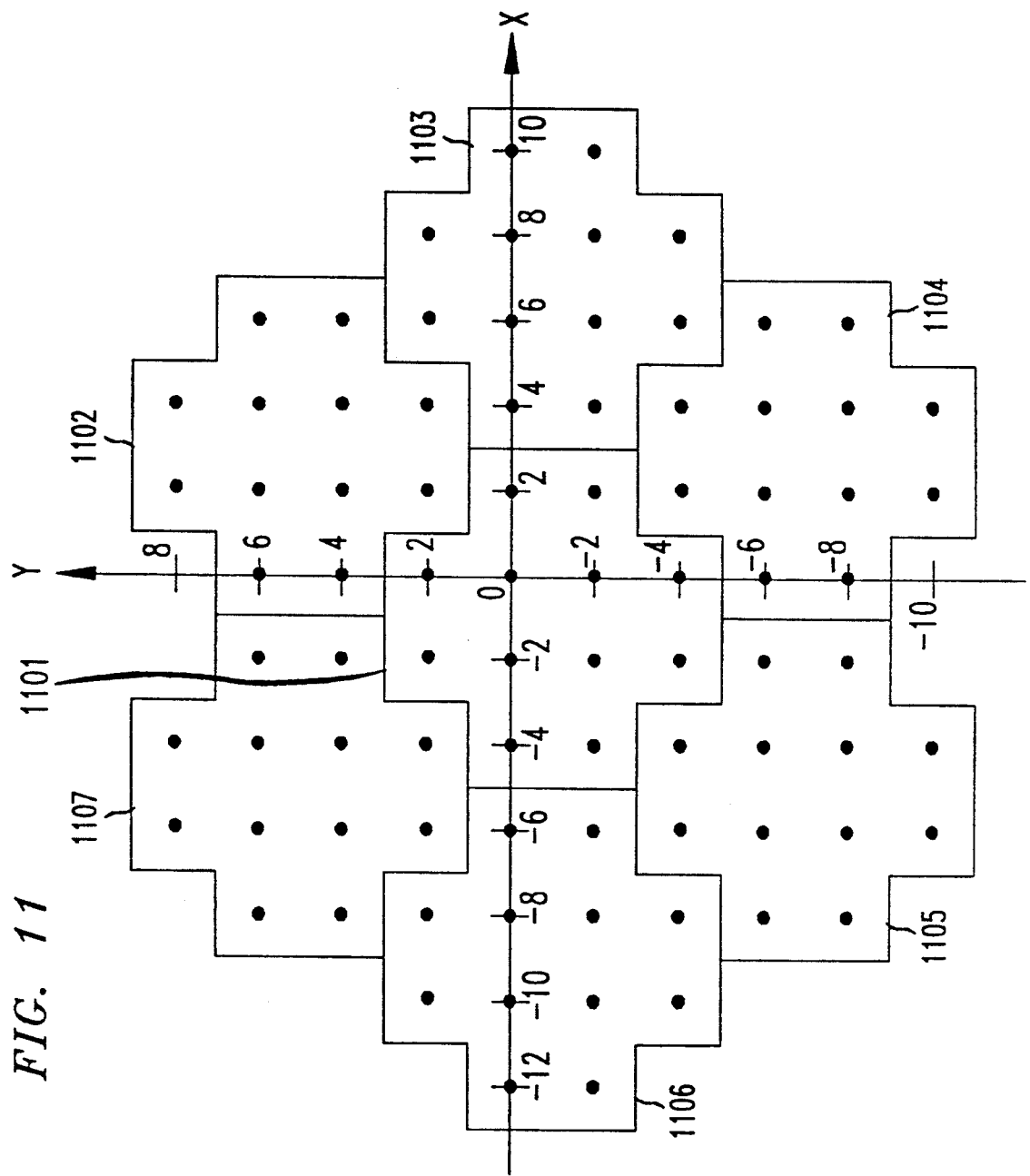
FIG. 11 is a signal plane representation helpful in illustrating the properties of the base constellation of FIG. 10.
Figure 12:
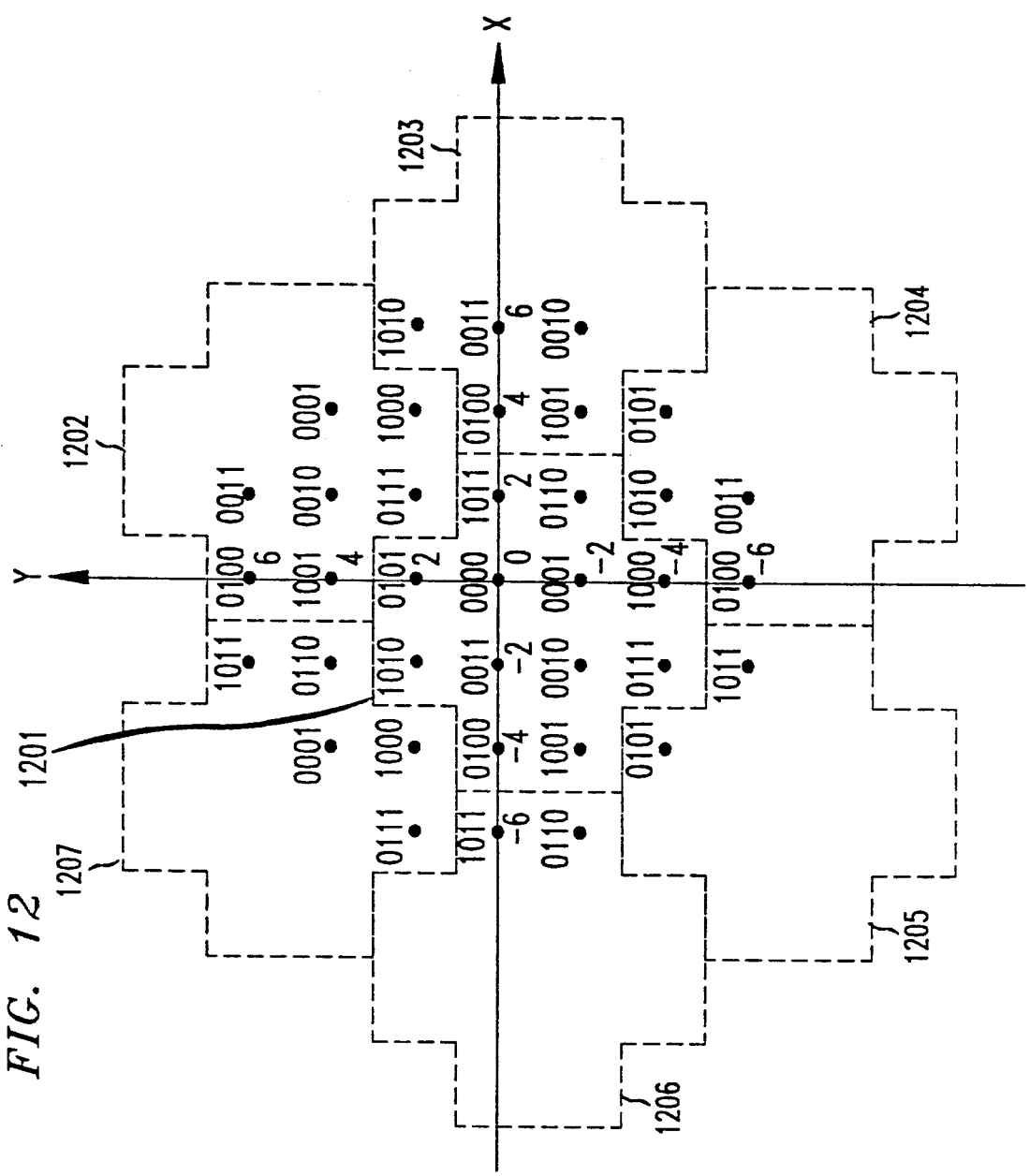
FIG. 12 depicts an expanded receiver constellation resulting from the use of the transmit constellation of FIG. 8 and base constellation of FIG. 10.

Comb filter 33 provides an output for each combined signal point. Moreover, as a direct consequence of the $(1-D^{-k})$ characteristic of comb filter 33, the symbols that are output by equalizer 35 are the symbols of the 37-symbol expanded receiver constellation of FIG. 12. This expanded receiver constellation is comprised of a base constellation 1201—which is identical to the base constellation of FIG. 10—plus certain symbols of various translates thereof 1202 through 1207. Each symbol of the expanded receiver constellation has an associated bit pattern, as shown in FIG. 12. In particular, the bit patterns associated with the twelve symbols of the base constellation are the same as the associated bit patterns in the transmitter, as shown in FIG. 10, while the bit patterns associated with the twelve symbols of any translate of the base constellation within the expanded receiver constellation are the same as the bit patterns of the associated base constellation symbols. Thus the symbols in FIG. 12 at (6,0) (2,−6) and (2,6) are all symbols in respective translates which correspond to the symbol of (−2,0) of the base constellation, and all four symbols are associated with the bit pattern 0011.

A stream of expanded receiver constellation symbols is identified by channel decoder 37 from the equalizer outputs by any of a variety of techniques depending, for example, on the nature of the encoding performed by channel encoder 12, the receiver complexity one is willing to have, etc., and the corresponding bits are delivered to HDTV display 39. The decoder will, of course, have stored within it a representation of FIG. 12 so that the input data that originally appeared on lead 13 can be recovered once the stream of receiver symbols is determined.

Although the above example illustrates the invention in the context of a combined precoder/mapper 951, it is possible to represent and, indeed, implement that structure as a separate precoder 14 and mapper 17 per FIG. 1. To do this, we construct a table having a) as its inputs, the present m input bits and the symbol that was output kT seconds ago (referred to herein as the "previous symbol") and b) as its output, the present output symbol. Such a table is shown in FIG. 13. In an actual implementation, one would typically use the bit patterns of FIG. 8 to represent the previous symbol. The table has 144 entries, corresponding to the twelve possible input bit patterns each combined with the twelve possible previous output symbols. The present output symbol corresponding to each input bit/previous symbol combination is arrived at using the methodology implemented by precoder/mapper 951. In the table, the symbols—both present and previous—are represented by the bit patterns shown in FIG. 8, which is arrived at by simply performing the above-described shifting carried out by constellation shifter 9521 and carrying along the bit patterns. For pedagogic convenience, the symbol coordinates are also shown.

The table thus constructed functions as precoder 14. That is, it converts each group of m input bits into a group of m output bits. The latter are then used to address constellation mapper 17 in accordance with the bit-to-symbol assignment scheme shown in FIG. 8.

Specific entries of the table are shown in FIG. 13 in order to exemplify an above-mentioned aspect of the invention. That aspect of the invention is that, in order to carry out the precoding for using transmit constellations other than those used by the prior art in this context—that is, in order to carry out partial-response-channel precoding using a constellation other than an M-PAM or $M^2$-QAM constellation—it is the case that both coordinates of the present transmitted symbol are selected jointly by at least one common precoder input bit. That is, it is not possible to separate the precoder input bits into two disjoint "rails" as in the prior art (e.g., FIG. 6) and separately precode them to separately identify the coordinates of the transmitted symbol. Alternatively stated, at least one of the precoder input bits is used to select both of the coordinates. (This formulation assumes the use of two-dimensional constellations. In the general case of 2N-dimensional constellations, N>1, the word "both" can be replaced by the phrase "at least two".)

To see the foregoing, we focus on that section of the table of FIG. 13 for which the symbol (3,1) is the previous transmitted symbol. Three successive ones of the twelve such entries are explicitly shown, those corresponding to the input bit values 0000, 0001 and 0010. Looking at the first and third of these, and carrying out the processing described above in connection with FIG. 9, it would be found that the present transmitted symbol is the symbol at (3,1) in the first case and (1,−1) in the second case (as shown in the table). Note that these two input words differ in only one bit position, while the X and Y coordinates of the resulting present transmitted symbols are different—the X coordinates being "3" and "1" and the Y coordinates being "1" and "−1". As a result, there is no way to divide these two 4-bit input words into two rails in which the bits of one rail determine the X coordinate of the present transmitted symbol and the bits of the other rail determine its Y coordinate. As a consequence, there is necessarily at least one bit—in this case the third bit—whose value is used to determine both the X and Y coordinates. Indeed, it is this aspect of the invention that allows for the use of other than M-PAM and M²-QAM constellations in systems employing partial-response-channel precoding.

One further point should be mentioned. In the embodiment just described, the bit mapping for the symbols in the base constellation within the expanded receiver constellation is the same as that used for the base constellation in the transmitter. This is due to the fact that the comb filter subtracts one symbol from another to provide its output. Thus the shifting caused by constellation shifter 9521 has no effect on the comb filter output. However, not all partial-response channels evidence this effect. As a consequence, one needs to compensate for the shifting carried out by constellation shifter 9521 through appropriate symbol-to-bit mapping for the expanded receiver constellation. The vector which defines that shift, when multiplied by the sum of the coefficients (which can be positive or negative) of the partial-response characteristic, results in some other vector. The latter vector is then used to shift the base constellation within the expanded receiver constellation—together with its bit mapping. As before, the bit patterns associated with the symbols of any translate of the now-shifted base constellation within the expanded receiver constellation are the same as the bit patterns of the associated shifted base constellation symbols.

Figure 14:
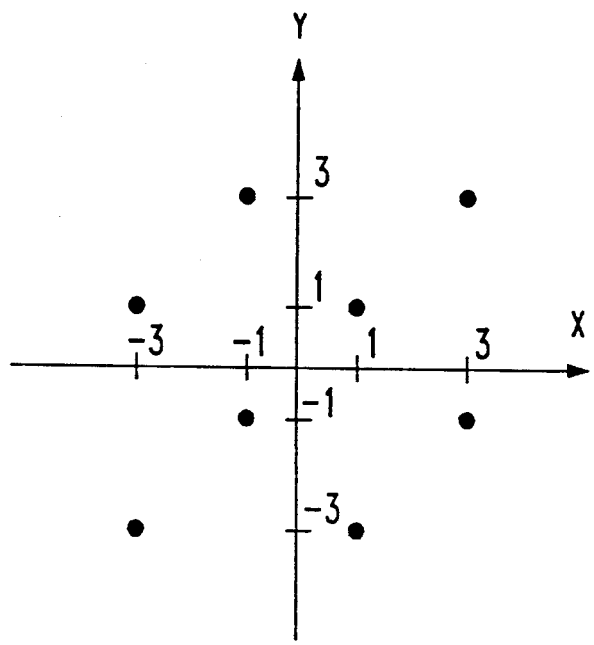
FIGS. 14–16 are illustrative other transmit constellations.
Figure 15:
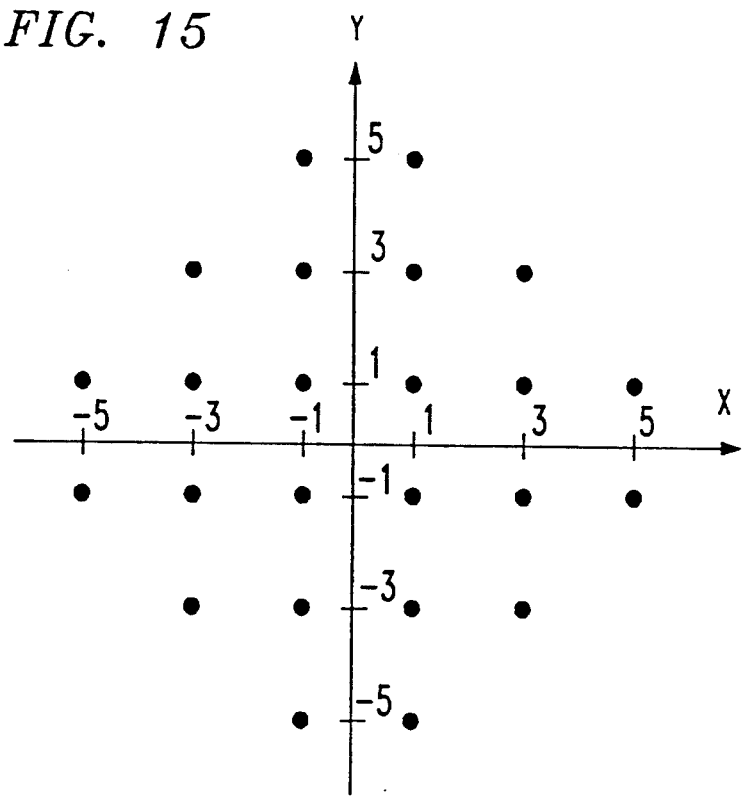
Figure 16:
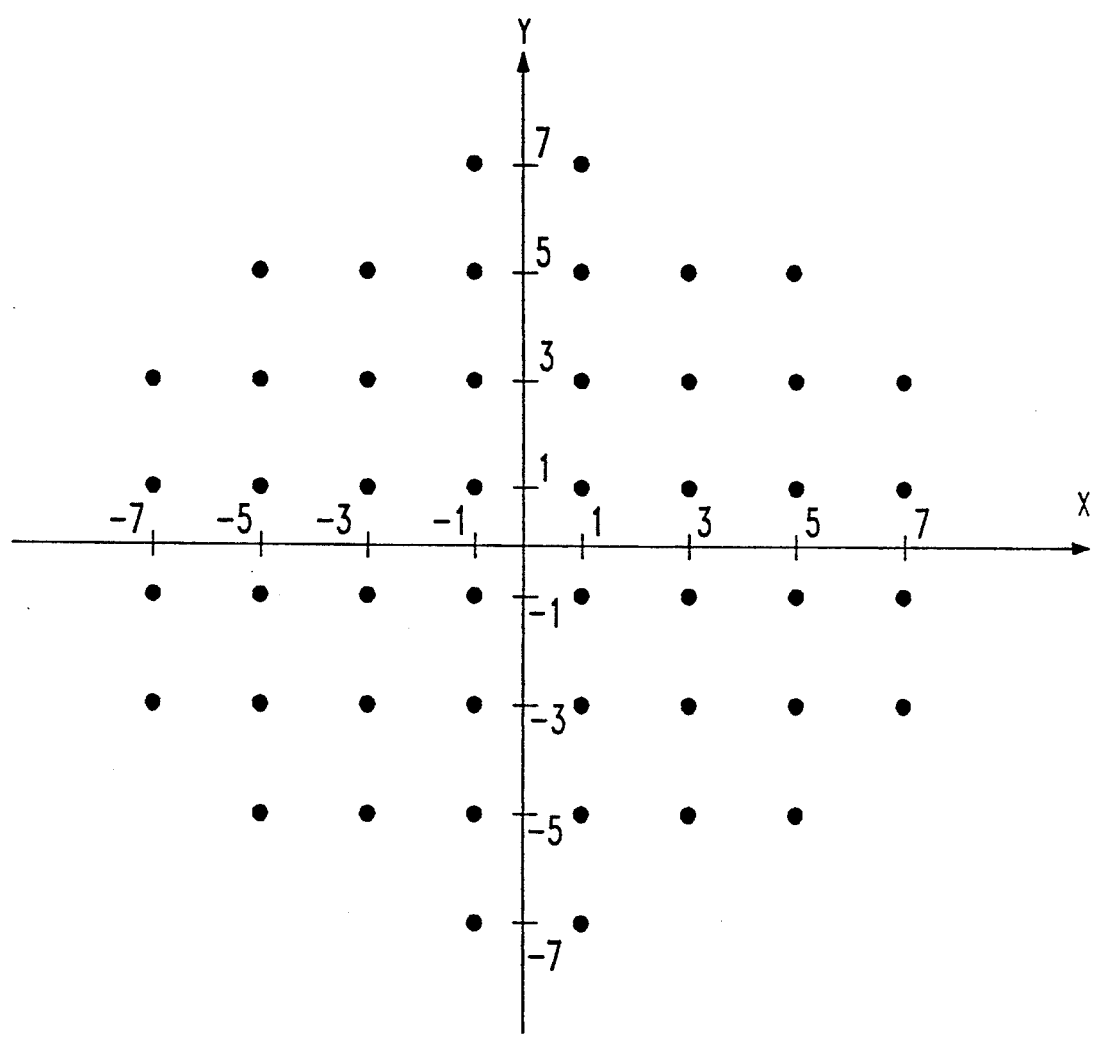

FIGS. 14 through 16 show other illustrative constellations that can be used as transmit constellations in systems embodying the principles of the invention. In particular, the constellation of FIG. 15 and, indeed, the constellation of FIG. 8 are examples of so-called generalized square constellations. The constellation of FIG. 16 is an example of a so-called generalized hexagonal constellation. (Appropriate base constellations corresponding to each of these transmit constellations are readily arrived at by shifting the transmit constellation so that it has a signal point at the origin.)

An advantageous aspect of the present invention is the fact that the bit-to-symbol mapping performed by base constellation mapper 9511 can be arbitrary. That is, the advantageous consequence of the precoding is achieved equally well no matter what mapping is used. As a result, it is possible to specify specific mappings in order to achieve some further desired end. In particular, as was mentioned earlier, channel encoder 12 may implement coded modulation. This may impose certain constraints on the bit-to-symbol mapping. Given that the precoding can be carried out with any mapping however, as just noted, there is no impediment to including coded modulation schemes in systems using partial-response-channel precoding in accordance with the invention.

The foregoing merely illustrates the principles of the present invention. Thus, for example, although the invention is illustrated in the context of systems using two-dimensional constellations, it is equally applicable to systems using constellations having only one dimension—where it would be particularly useful if the partial-response channel had a complicated characteristic—or having more than two dimensions. The constellations may have various numbers of signal points, depending on the system requirements. Indeed, it will be appreciated that each of the constellations explicitly shown herein is representative of an entire family of constellations having particular geometric characteristics.

Moreover, the invention is not limited to so-called "uniformly spaced" constellations, of which all the constellations shown and described to this point are examples. Rather, the invention can be used with non-uniform constellations, such as that described in my allowed U.S. patent application Ser. No. 611,200 filed Nov. 7, 1990, now U.S. Pat. No. 5,105,442 issued Apr. 14, 1992. In preferred embodiments using non-uniform constellations, the location in the signal space of the symbols of the non-uniform constellation corresponds to a point of an underlying lattice and the transmit constellation consists of all points of the underlying lattice within a finite region. In general, there will be more points in the transmit constellation than in the non-uniform constellation. An appropriate base constellation corresponding to this transmit constellation is readily arrived at by shifting the transmit constellation so that it has a point at the origin. Not all of those points of the base constellation are actually addressed by the m input bits—rather only those points which correspond to the symbols in the non-uniform constellation itself. (It may be desirable in certain partial-response-channel precoding applications using non-uniform constellations to carry out the precoding by using a Tomlinson filter.)

It will be further appreciated that although the various components of the transmitter and receiver are disclosed herein as being discrete functional circuits, the function of any one or more of them may be realized by one or more appropriately programmed processors, digital signal processing chips, etc.

It should also be noted that the invention may be found useful in contexts other than HDTV or video coding/transmission.

Also, in implementing the invention in the context of the multiplexing technique described in my aforementioned co-pending patent application, one should ensure that the base constellation used in the base constellation mapper 9511 in FIG. 9 for the present symbol interval is the same as those used for the earlier symbol intervals with affect the feedback signal on lead 9513. In the case where one base constellation is a subset of another base constellation, this restriction may be relaxed.

Those skilled in the art will thus be able to devise numerous arrangements which, although not explicitly shown or described herein, embody the principles of the invention and are within its spirit and scope.

I claim:

1. Apparatus comprising
   means for selecting, in response to input data, a sequence of signal points from a predetermined base constellation,
   means for combining each selected signal point with a feedback signal to provide a sequence of combined signal points, said feedback signal being a predetermined function of at least one previously provided one of the combined signal points, said base constellation and said function being such that ones of said combined signal points are signal points of said base constellation and the others are signal points of minimally non-overlapping lattice translates of said base constellation, and
   means for providing a transmit signal which represents said combined signal points, all of the combined signal points which are minimally non-overlapping lattice translates of one another being represented identically.

2. The invention of claim 1 wherein the signal points of the base constellation are points of an underlying lattice which has a point at the origin and wherein the underlying lattice can be formed as the union of non-overlapping translates of the base constellation.

3. The invention of claim 2 further comprising means for applying said transmit signal to a communication channel which introduces forced intersymbol interference, and said predetermined function is such as to counter effects of said forced intersymbol interference.

4. The invention of claim 3 wherein said providing means represents each combined signal point in said transmit signal by a particular one symbol of a predetermined transmit constellation.

5. The invention of claim 4 wherein said constellation is a shifted version of said base constellation.

6. The invention of claim 3 wherein said communication channel includes a comb filter which provides an output for each combined signal point; wherein said selecting means selects each signal point of the sequence in response to a respective subset of said input data; and wherein said predetermined function is such as to enable recovery of each subset of input data from a respective one of the outputs of said comb filter independent of any of the other outputs of said comb filter.

7. The invention of claim 1 further comprising
means for applying said transmit signal to a communication channel,
means for receiving said transmit signal from said communication channel, and
means for processing the received transmit signal to recover said input data.

8. Apparatus comprising
means for generating in response to a sequence of binary input words a sequence of transmit symbols of a predetermined transmit constellation, said binary input words having a predetermined number of different values which is substantially equal to the number of symbols of said transmit constellation, and
means for transmitting said sequence of transmit symbols over a channel which has a predetermined partial-response characteristic and which provides in response to said sequence of transmit symbols a sequence of receiver symbols of an expanded receiver constellation,
said generating means including means for selecting, for each of said words, a respective symbol of said transmit constellation, said selecting and said constellation being such that each word can be recovered from a respective one of said receiver symbols independent of any other one of said receiver symbols,
each of said transmit symbols having at least first and second coordinates and said transmit constellation and said expanded receiver constellation being other than $M^2$-ary quadrature amplitude modulation constellations.

9. The invention of claim 8 wherein said channel includes a comb filter, each different output of said comb filter corresponding to a different one of the symbols of said expanded receiver constellation.

10. The invention of claim 8 further comprising means for recovering said input data from said sequence of receiver symbols.

11. Apparatus for use in a data communication system in which a sequence of transmit symbols selected from a predetermined transmit constellation in response to binary input data is transmitted over a communication channel having a predetermined partial-response characteristic, said binary input data having a predetermined number of different values which is substantially equal to the number of symbols of said transmit constellations, said channel providing, in response to said transmitted symbols, a sequence of receiver symbols of an expanded receiver constellation, each of said transmit and receiver symbols having at least first and second coordinates, each transmit symbol being selected for a respective binary word of said data in such a way that that binary word can be recovered from a respective one of said receiver symbols independent if any other one of said receiver symbols,
said apparatus comprising
means for receiving said sequence of receiver symbols, and
means for recovering said data from the sequence of receiver symbols received by said means for receiving in response to stored information which associates each different receiver symbol with a different binary word value, the values of the bits of each said binary word value interdependently identifying the values of the first and second coordinates of the associated receiver symbol.

12. The invention of claim 11 wherein said channel includes a comb filter, each different output of said comb filter corresponding to a different one of the symbols of said expanded receiver constellation.

13. A method comprising the steps of
selecting, in response to input data, a sequence of signal points from a predetermined base constellation,
combining each selected signal point with a feedback signal to provide a sequence of combined signal points, said feedback signal being a predetermined function of at least one previously provided one of the signal points, said base constellation and said function being such that ones of said combined signal points are signal points of said base constellation and the others are signal points of minimally non-overlapping lattice translates of said base constellation, and
providing a transmit signal which represents said combined signal points, all of the combined signal points which are minimally non-overlapping lattice translates of one another being represented identically.

14. The invention of claim 13 wherein the signal points of the base constellation are points of an underlying lattice which has a point at the origin and wherein the underlying lattice can be formed as the union of non-overlapping translates of the base constellation.

15. The invention of claim 13 comprising the further step of applying said transmit signal to a communication channel which introduces forced intersymbol interference, and wherein in said combining step said predetermined function is such as to counter effects of said forced intersymbol interference.

16. The invention of claim 13 wherein in said providing step all of the combined signal points which are minimally non-overlapping lattice translates of one another are represented in said transmit signed by a particular one symbol of a predetermined transmit constellation.

17. The invention of claim 16 wherein said transmit constellation is a shifted version of said base constellation.

18. The invention of claim 16 wherein said method includes the further step of applying said transmit signal to a communication channel which includes a comb filter, said comb filter providing an output for each combined signal point; wherein in said selecting step each signal point of the sequence is selected in response to a respective subset of said input data; and wherein in said combining step said predetermined function is such as to enable recovery of each subset of input data from a respective one of the outputs of said comb filter independent of any of the other outputs of said comb filter.

19. The invention of claim 18 wherein the signal points of the base constellation are points of an underlying lattice which has a point at the origin and wherein the underlying lattice can be formed as the union of non-overlapping translates of the base constellation.

20. The invention of claim 13 comprising the further steps of applying said transmit signal to a communication channel, receiving said transmit signal from said communication channel, and processing the received transmit signal to recover said input data.

21. A method comprising the steps of receiving input data, processing said input data to generate in response thereto a sequence of transmit symbols of a predetermined transmit constellation, and transmitting said sequence of transmit symbols over a channel which has a predetermined partial-response characteristic and which provides in response to said sequence of transmit symbols a sequence of receiver symbols of an expanded receiver constellation, each of said transmit symbols having at least first and second coordinates, said processing step including the step of selecting, for each of a succession of subsets of said input data, a respective symbol of said transmit constellation, said selecting and said constellation being such that each subset can be recovered from a respective one of said receiver symbols independent of any other one of said received symbols, said subsets having a predetermined number of different values which is substantially equal to the number of symbols of said transmit constellation, and said selecting step being such that at least two of the coordinates of at least ones of the transmit symbols are selected jointly by at least a portion of the respective subset.

22. The invention of claim 21 wherein said transmit constellation and said expanded receiver constellation are other than $M^2$-ary quadrature amplitude modulation constellations.

23. The invention of claim 21 wherein said input data is binary data, wherein each of said subsets is a binary word comprised of respective bits of said binary data, wherein each selected transmit constellation symbol is selected as a function of the value of the bits of the respective one of said binary words, and wherein said portion is at least one bit of the respective binary word.

24. The invention of claim 21 wherein said channel includes a comb filter, each different output of said comb filter corresponding to a different one of the symbols of said expanded receiver constellation.

25. The invention of claim 21 comprising the further step of recovering said input data from said sequence of receiver symbols.

26. A method for use in a data communication system in which a sequence of transmit symbols selected from a predetermined transmit constellation in response to binary input data is transmitted over a communication channel having a predetermined partial-response characteristic, said channel providing, in response to said transmitted symbols, a sequence of receiver symbols of an expanded receiver constellation, each transmit symbol being selected for a respective binary word of said data in such a way that that binary word can be recovered from a respective one of said receiver symbols independent of any other one of said receiver symbols, there being a number of different binary word values, that number being substantially equal to the number of symbols of said transmit constellation, said method comprising the steps of receiving said sequence of receiver symbols, and recovering said data from the sequence of received receiver symbols in response to stored information which associates each different receiver symbol with a different stored binary word value, said transmit constellation and said expanded receiver constellation being other than M-PAM or $M^2$-ary quadrature amplitude modulation constellations.

27. The invention of claim 26 wherein said channel includes a comb filter, each different output of said comb filter corresponding to a different one of the symbols of said expanded receiver constellation.

* * * * *

UNITED STATES PATENT AND TRADEMARK OFFICE
CERTIFICATE OF CORRECTION

PATENT NO. : 5,311,547
DATED : May 10, 1994
INVENTOR(S) : Lee-Fang Wei

It is certified that error appears in the above-indentified patent and that said Letters Patent is hereby corrected as shown below:

```
Column 15, line 12 of the patent, after "said" insert --transmit--.
Column 16, line 35 of the patent, after "the" insert --combined--.
```

Signed and Sealed this

Seventeenth Day of October, 1995

Attest:

BRUCE LEHMAN

*Attesting Officer*    *Commissioner of Patents and Trademarks*